E. S. PIERCE.
MACHINES FOR THREADING SCREWS.
No. 183,415.
2 Sheets—Sheet 1.
Patented Oct. 17, 1876.
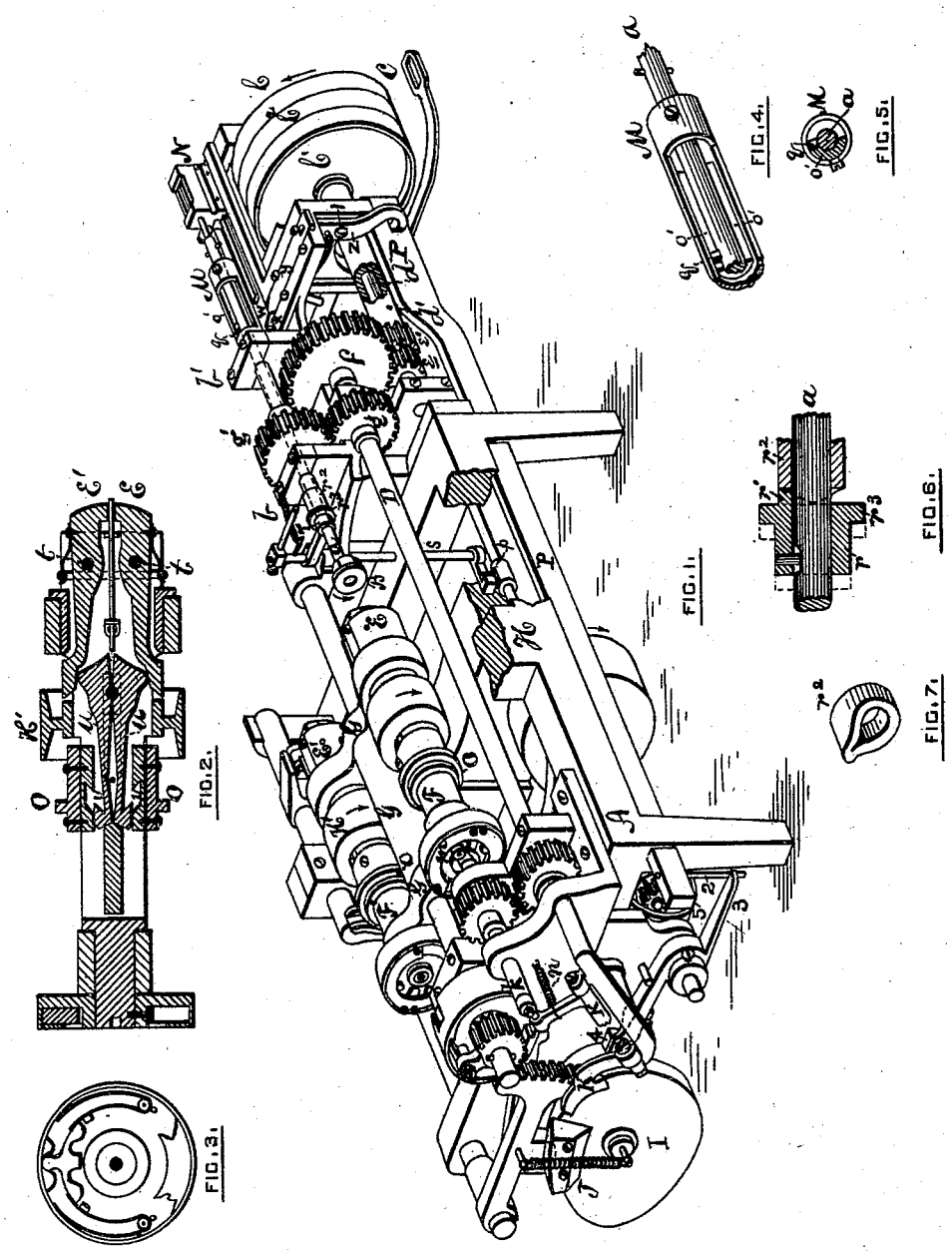
WITNESSES.
INVENTOR.

2 Sheets—Sheet 2.
E. S. PIERCE.
MACHINES FOR THREADING SCREWS.
No. 183,415. Patented Oct. 17, 1876.
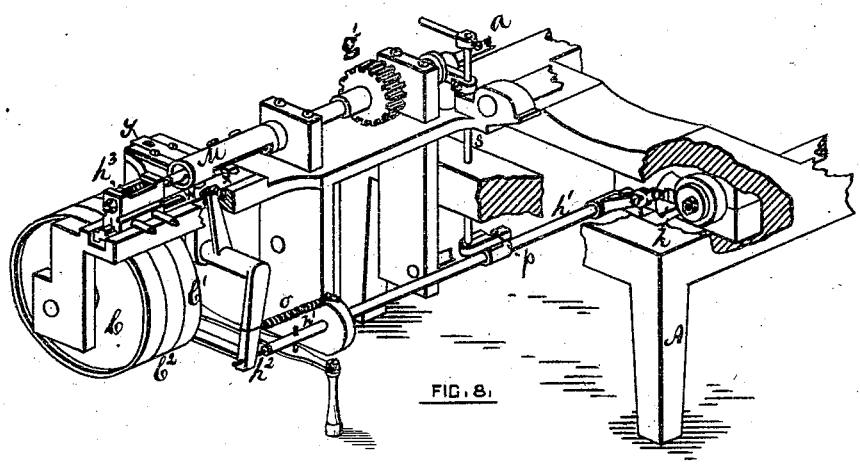
FIG. 8.
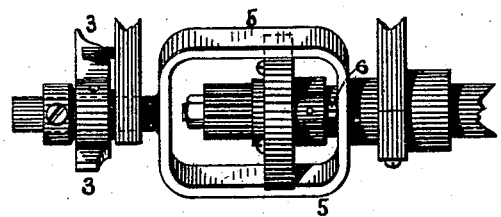
FIG. 9.
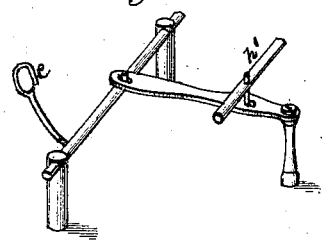
Fig. 13.
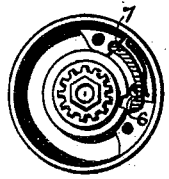
FIG. 10.
FIG. 11.  FIG. 12.
WITNESSES: INVENTOR:

UNITED STATES PATENT OFFICE.

ELIJAH S. PIERCE, OF HARTFORD, CONNECTICUT, ASSIGNOR TO NATIONAL SCREW COMPANY, OF SAME PLACE.

IMPROVEMENT IN MACHINES FOR THREADING SCREWS.

Specification forming part of Letters Patent No. 183,415, dated October 17, 1876; application filed July 11, 1876.

*To all whom it may concern:*

Be it known that I, ELIJAH S. PIERCE, of Hartford, in the county of Hartford and State of Connecticut, have invented certain new and useful Improvements in Machines for Threading Screws; and I do hereby declare that the following specification, taken in connection with the drawings making a part of the same, is a full, clear, and exact description thereof.

Figure 1 is a perspective view of the complete organized machine, with the exception of the devices for selecting the blanks from a mass and feeding them one by one to the holding-jaws, which, being well known in the art of making screws, is omitted. Figs. 2 to 13 are details, to more fully illustrate the invention.

The machine belongs to that class of screw-making machines which employ dies for cutting what are called "fine-threaded" or machine screws, as distinguished from "coarse-threaded" wood-screws, in which the thread is cut by a reciprocating chasing-tool.

The first part of my invention relates to a mode of operation whereby the machine is enabled to cut a thread practically of uniform depth around a blank, notwithstanding that the blank is not, as frequently happens, so held by the jaws that its axis is, while revolving, perfectly coincident with the axis of the revolving spindle in which the griping-jaws are mounted; and the essential means by which I have improved the machine in this particular consist in giving to the jaw-spindle a rotary movement on its axis in the opposite direction from the rotary movement which is given to the threading-dies.

Referring to the drawings, A, Fig. 1, is the frame of the machine, which supports the several parts. B is a die-holder, of any preferred construction, mounted on the end of the arbor, and which holder is to be furnished with suitable dies for cutting a screw-thread. The arbor $a$ revolves in a tube set in proper bearings $b$ $b'$, and is rotated in the right direction for cutting a thread, and afterward in the opposite direction, for backing off the same, by means of the pulleys C and $C^1$, respectively driven by a belt. The intermediate pulley $C^2$ is an idler. The belt is under the control of the shipper $c$, and when driving the pulley C it causes the shaft $d$ to revolve, whose motion is communicated, by the toothed wheel $e$, to the gear-wheel $f$ on the shaft D. This shaft carries a pinion, $g$, which, engaging with the gear-wheel $g'$, drives the die-arbor in the right direction for cutting a thread on the blank.

When the belt-shipper moves the driving-belt from the pulley C to the pulley $C^1$, motion is given to the hollow shaft or sleeve $d'$, which, carrying a toothed wheel, $e'$, gives motion to an intermediate loose pinion, (not shown,) which is in engagement with the toothed wheel $f$, and causes the die-arbor to revolve in the direction proper to enable the dies to back off from the threaded blank.

The die-arbor is capable of a longitudinal movement in its bearings, which is effected by means of devices not necessary to be minutely described, as they are not essentially different from those already employed in machines of this class, and which, in this instance, are illustrated at Fig. 8 of the drawings, where it will be seen that a cam, $h$, on the main cam-shaft of the machine, at a proper time in its revolution, imparts a longitudinal movement in its bearings to the rod $h^1$, and this, operating the bell-crank arm $h^2$, gives the forward movement to the die-arbor, which enables the dies to be pressed against the end of the blank to commence the thread. A spring-cushion, $h^3$, is made to bear against the end of the die-spindle, as in other screw machinery before my invention, whereby the dies are brought up against the blank under yielding pressure, in a well-understood way.

In combination with the revolving dies for cutting the thread, are two pairs of griping-jaws, for holding the blanks to be threaded. These jaws E E', Fig. 1, are respectively attached to spindles F F', which are mounted in a yoke-frame, G, similar to the arrangement shown in the Sloan system of nickers and shavers. This frame is arranged to make, by means substantially the same as those hitherto employed, a half-revolution intermittently, so as to bring the axis of each pair of jaws successively into coincidence with the axis of the revolving dies.

It is to be supposed that while one pair of the jaws is holding a blank which is undergoing the operation of threading, the fellow pair of jaws is receiving a fresh blank by means of any one of the many automatic feeding attachments employed in screw-cutting machines.

Upon the completion of the threading operation, and after the threading-dies have backed off clear of the screw, the yoke G makes a half-revolution, which brings the other pair of jaws into proper relation to the dies to enable the blank held by them to be threaded. While one pair of jaws is holding a blank which is being threaded, the other pair of jaws is holding a blank which is being pointed by means of a pointing-tool, which is moved up to the end of the blank for that purpose. The spindle which holds the blank so being pointed is driven by a belt, which runs over a jockey-pulley mounted on the top of a standard, (shown broken off at H,) and extends over the machine, partly around the pulley H′ on the spindle F′.

The operation of the machine, so far as the combination of the pointing-tool with the revolving jaw-spindle driven by a jockey-pulley is concerned, is analogous to that exhibited in the Sloan nicking and shaving machine, and will be understood by all builders of screw machinery.

In order to give a rotary movement to the spindle which is occupied in holding the blank to be threaded in a direction opposite to that in which the threading-dies are revolving, and which constitutes, as above declared, a mode of operation in machinery for threading screws which is the first feature of the present invention, I provide certain means for causing the said spindles F F′, while they are respectively in the position for holding the blank for the threading-dies to perform their office, to become connected with the necessary power to cause such spindles to be rotated, and provide also means for disconnecting such spindles from such power when the operation of the machine requires the yoke-frame G to make a semi-revolution.

Each spindle has its rear head opposite to the end which carries the griping-jaws furnished with a clutch face-plate. (Shown at Fig. 3.)

Upon the end of the main cam-shaft is located the cam I, which, in the Sloan system of machinery, performs the function of causing the yoke-spindle frame to be rotated. Upon the side of this cam is a projecting surface, J, Fig. 1, which, as the said cam revolves, will operate at stated times the lever K. (Shown broken off to prevent hiding other parts in the drawing.) This lever controls the short shaft $k$, which is capable of an endwise movement in its bearings. The inner end of this shaft is furnished with an arm, $m$, carrying a projecting wrist-pin, and which, when the shaft is moved endwise up to the head of the spindle which is engaged in holding the blank to be threaded, will constitute a clutch-gear. A spring, $n$, tends, by its tension, to always keep the shaft in that relation to the spindle-head which will clutch the two together; but the projecting side cam J, at certain prescribed times breaks, that connection. Now, when the yoke-frame is required to make a semi-revolution, the cam J is in action, and the connection is broken; but when the frame has reached its position for resting, the lever K being relieved from the action of the cam J, the spring $n$ will cause the shaft to become clutched to the spindle, which is holding the blank to be threaded. The shaft $k$ has a rotary movement given to it by power derived from the main driving-shaft always in a direction opposite to that in which the die-arbor is revolving, and hence, whether the thread is being cut or the threading-dies are backing off, the motion of the spindle and the motion of the dies will be in opposite directions.

The relative speed at which the spindle is rotated may be less, greater, or equal to the speed at which the dies are rotated. This is a matter depending on the judgment of the constructer. I prefer to rotate the spindle about one-half as fast as the dies rotate.

Before the yoke-frame G can be permitted to make a semi-revolution it is necessary that the dies which have cut the thread should be entirely clear of the blank upon which they have operated. To insure this, as well as to allow the mechanism which causes the yoke-frame to be rotated to be brought into action, the following mechanism is employed:

The backward movement of the die-arbor, caused by the rotation of the dies in backing off on the thread which they have just cut, would cease when the end of the thread near the point of the blank is reached; but there is arranged parallel to the arbor a flat plate or bar, $w$, Figs. 1 and 8, which slides between suitable guides. This plate is attached to the rear end of the arbor by a clamp-block, N, so that the said plate shall partake of the movement of the arbor backward and forward, and the relation of the plate to the arbor can be adjusted, as to be presently explained. Near the forward end of the plate $w$ a notch having an inclined face, $x$, Figs. 1 and 8, is cut, the position of which relatively to any position of the arbor in backing off can be adjusted by the clamp-block which connects the plate $w$ with the arbor above mentioned. In combination with the said plate $w$, and in this instance at right angles therewith, is a plate, $y$, arranged to slide between guides. The front end of this plate is beveled. The upper end of a lever, $z$, pivoted to the side of the frame at 1, enters a slot or recess in the sliding plate $y$, and a spring is so applied to this arm that its tension shall cause the upper end of the arm to press forward, and thereby cause the end of the plate $y$ to press constantly against the side of the sliding bar or plate $w$. The lower end of the lever $z$ is bent into the form of a hook, and this hooked portion engages at all times when the lever $z$ stands vertically with a mortise cut in the long sliding bar P, Fig. 1. The effect of the engagement of the hook with the said sliding bar is to throw entirely out of gear the mechanism which operates to cause the yoke-frame to revolve. When, however, in consequence of the backward movement of the die-arbor, the sliding plate w has been brought to such position that the edge of the notch x, cut in the plate w, is presented to the beveled end of the sliding plate y, the latter, by the impulse of the spring connected with it, before mentioned, moves forward, and, by the contact of its beveled end with the inclined face of the notch, moves backward the plate w, and incidentally the die-arbor, so that the face of the dies is entirely clear of the pointed end of the blank which has been threaded. At the same time the hooked end of the lever z is thrown out of the mortise in the sliding bar P, whereupon the mechanism for shifting the yoke-frame is thrown again into gear. This mechanism is seen partly at Fig. 1, and partly at Figs. 9, 10, 11, and 12. A downwardly-projecting rod, 2, on the sliding bar P, acts, when the hooked end of the arm z is in its mortise, as a fulcrum for the lever 3, Fig. 1. The revolution of the main cam-shaft causes a projecting face, 4, Fig. 1, to act against the side of the lever 3, whereby the yoke 5, Fig. 9, is pulled, and this causes a small pin, 6, Fig. 9, (shown in full at Fig. 12,) having an inclined face, to move forward, also, and disengage a pawl, 7, Fig. 10. (Shown in full at Fig. 11.) This disengagement of the pawl breaks the connection of mechanism which causes the cam-shaft to revolve.

Another feature of my invention consists in a means for instantaneously shifting the driving-belt from the pulley which gives motion to the different parts of the machine while the thread is being cut in the blank to the pulley which causes the dies to revolve in the opposite direction, for backing off clear of the threaded blank. In the first place, the belt-shipper c is operated to effect this change by the power of a spring, o, Fig. 8, and the shipper is held in place against the tension of this spring by a latch-gear, (shown at p.) This device is in common use in this class of machinery. The die-arbor a, previously referred to, is shown in section at Fig. 4, and is combined with the clutch-sleeve M, which revolves with the arbor, and the connection between the sleeve and the arbor is maintained by two adjustable ribs or lips, o', set longitudinally on the inner surface of the sleeve, and by a projecting pin, q, on the side of the arbor.

The arbor with the projecting pin could be revolved inside the sleeve were it not for one or the other of the ribs or lips referred to, against which the pin is stopped. The ribs do not extend the whole length of the sleeve, and the dies, after they have commenced to cut a thread, act, in this as in other die-threading machines, as their own leader. Hence, when the full extent of the thread has been cut, the arbor, which has a longitudinal movement independent of the sleeve, has progressed forward to such an extent that the pin q has reached the end of the rib against which it was previously abutting. The sleeve and arbor are now disconnected, and the latter will immediately cease revolving in the direction for thread-cutting, but will immediately reverse its direction of rotation, from the fact that the jaw-spindle, as already explained, is revolving, and the friction of the dies with the threaded screw will impart to the arbor the movement which the jaw-spindle has. So soon as the arbor commences to revolve in the reverse direction, a sleeve, r, (shown enlarged at Fig. 6, and which has a pin, $r^1$, projecting from its face,) comes into contact with the cam-shaped end, Fig. 7, of the tube $r^2$, within which the arbor revolves; and as such sleeve r is connected by a spline with the arbor a, it will be moved longitudinally on the arbor for a short distance, but far enough to cause a flange, $r^3$, on the sleeve to operate a projecting arm on the belt-shipper rod s, lying in its path, and trip the latch-fastening p. The spring o, Fig. 8, will instantly cause the shipper to run the belt from the pulley C to the pulley $C^1$. The spring o, operating upon the crank-lever at $h^2$, Fig. 8, causes the lever, by abutment with the end thereof, to throw the sliding rod $h^1$ backward as soon as it is released by the latch p. The rod $h^1$, near its front end, has a vertical pin, which occupies a slot in a horizontal lever, pivoted at one end to the top of a post, and which is connected at its other end, by a slot or pin, with the sliding bar which carries the shipper c, as illustrated in Fig. 13 in perspective.

Another feature of my invention consists in the manner in which I have organized the respective spindles which carry the griping-jaws, so that the necessary degree of power to hold the blank firmly shall be obtained at the same time that the jaws shall open wide enough to admit easily the head of a blank.

A section of one of the spindles is shown at Fig. 2. The griping-jaws E E' have their fulcra at t t. The sleeve O, the movement of which is ultimately to operate these jaws, is combined directly with a pair of levers, u u, so that when the sleeve is moved forward the first effect will be to move forward also the levers, which are capable of a longitudinal movement, and cause their heads to enter between the long arms of the jaw-levers; and the second effect is for cam-faces on the sleeve to ride up inclined planes on the end of such levers u u, whereby a powerful force is exerted upon the long arms of the jaw-lever to spread them apart, which force is greatly increased, for the purpose of griping the blank, by the difference between the long and the short arms of the jaw-levers. Thus, by this system of compound levers, the arrangement of which is clearly shown in the drawing, the advantage of a wide opening for the jaws is secured, with a great power of gripe upon the blank. When the jaws are to be opened the sleeve is slid backward, whereupon the catches *v v* on the sleeve engage with the notches on the projecting pieces on the ends of the levers *u u*, and the effect is to pull bodily backward the levers from contact with the jaw-levers. A spring suitably arranged then acts to open the jaws to their full extent to receive the head of a blank.

What I claim as my invention, and desire to secure by Letters Patent, is—

1. The combination, in a machine for threading screws, of revolving dies for cutting the thread with jaws for griping the blank to be threaded, revolving cotemporaneously in the opposite direction, substantially as described, and for the purposes specified.

2. The combination, in an intermittingly-revolving yoke-frame, of two spindles, provided with griping-jaws, and with clutch mechanism, substantially as described, for connecting either spindle, while threading a blank, with the shaft from which it derives the rotary movement requisite for the threading operation, substantially as described.

3. The combination of the die-arbor in a screw-cutting machine with mechanism, substantially as described, for giving a backward movement to the arbor, to enable the dies to clear the point of the threaded blank, and mechanism, substantially as described, for throwing out of and into gear the mechanism which causes the yoke-frame to be rotated, substantially as specified.

4. The combination of revolving jaws for holding a blank to be threaded, a die-arbor carrying threading-dies, revolving, while cutting the thread, in a direction opposite to the direction of rotation of the holding-jaws, and mechanism, substantially as described, for enabling any suitable spring-acting belt-shipper to act to change the direction of rotation of the jaws and the threading-dies, respectively, substantially as specified.

5. The combination, in a spindle for griping a blank in a screw-machine, of the griping-jaws, the internal compound levers, having a longitudinal movement, and a sliding sleeve, for moving the internal levers forward and backward, and causing them also to vibrate on their fulcra, substantially as described, whereby a wide extent of opening can be obtained, to enable the jaws to receive a blank, coupled with a powerful gripe, to enable the jaws to hold the blank.

ELIJAH S. PIERCE.

Witnesses:
FRANK H. PIERCE,
THEO. G. ELLIS.